United States Patent [19]

Burns

[11] 3,765,073

[45] Oct. 16, 1973

[54] APPARATUS FOR ASSEMBLING A COMPONENT OF PARTS COMPRISING TERMINATIONS, CONDUCTOR LEADS AND ENCLOSURES

[75] Inventor: Robert W. Burns, West Orange, N.J.

[73] Assignee: General Cable Corporation, New York, N.Y.

[22] Filed: Jan. 27, 1971

[21] Appl. No.: 110,006

[52] U.S. Cl. .............................................. 29/203 D
[51] Int. Cl. .............................................. H01r 43/04
[58] Field of Search .................... 29/203 D, 203 DG, 29/203 TS, 203 R; 72/410, 412

[56] References Cited

UNITED STATES PATENTS 3,402,452 9/1968 Mraz .............................. 29/203 D
3,455,006 7/1969 Reem et al. ...................... 29/203 D

*Primary Examiner*—Thomas H. Eager
*Attorney*—Sandoe, Hopgood & Calimafde

[57] ABSTRACT

This apparatus has means for connecting elements of an electric circuit component by securing terminations to an enclosure, crimping the terminations to conductors, and bending the terminations downward, inward and upward around the end of the enclosure so that the crimped ends and the conductors are within the enclosure. The enclosure is held in a nest which shifts between crimping, forming and discharge stations; and there are tools that are guided into positions to operate on the terminations at the crimping and forming stations.

10 Claims, 10 Drawing Figures

INVENTOR
Robert W. Burns
BY Sandoe, Hopgood & Calimafde
ATTORNEYS.

2 Sheets-Sheet 2

INVENTOR
Robert W. Burns
BY Sandoe, Hopgood & Calimafde.
ATTORNEYS.

APPARATUS FOR ASSEMBLING A COMPONENT OF PARTS COMPRISING TERMINATIONS, CONDUCTOR LEADS AND ENCLOSURES

BACKGROUND AND SUMMARY OF THE INVENTION

The connecting of terminations with conductors and the assembly of the conductors and the terminations with the enclosures in miniature electric circuitry involved prohibitive labor unless much of it can be automated.

This invention provides apparatus for conductors and terminations and for locating them in an enclosure of an electric component with substantial saving in time and labor and with uniform results.

An enclosure is placed in a spring loaded nest. Terminations are inserted in sockets in the enclosure and a slide is actuated to secure the termin-ations in parallel positions on the enclosure with parts of the terminations extending beyond the end of the enclosure. Conductors are inserted in a stationary nest with the ends of the conductors placed over the terminations at desired positions. The apparatus is operated to bring a tool down to crimp the terminations to the end portions of the conductors, and in the pre-ferred construction a knife blade cuts off any excess length of any conductors which extend further than desirable beyond the crimped portion.

The conductors are then released from the stationary nest and the assembly remains intact with respect to the movable nest. A slide which carries the movable nest is then operated to shift the assembly from the crimping station to a forming station where the extending portions of the terminations are bent downwardly and then inwardly and upwardly into the enclosure through an open bottom of the enclosure to bring the ends of the terminations with conductors crimped to them into positions under the portions of the terminations that are located above the enclosure.

After the forming operation, the nest is moved back into an intermediate position between the crimping and forming stations where there is sufficient clearance for the enclosure and its connected parts to be removed.

Other objects, features and advantages of the invention will appear or be pointed out as the description proceeds.

BRIEF DESCRIPTION OF DRAWING

In the drawing, forming a part hereof, in which like reference characters indicate corresponding parts in all the views.

DESCRIPTION OF PREFERRED EMBODIMENT

Figures 1, 2, 3, 4, 5, 6:
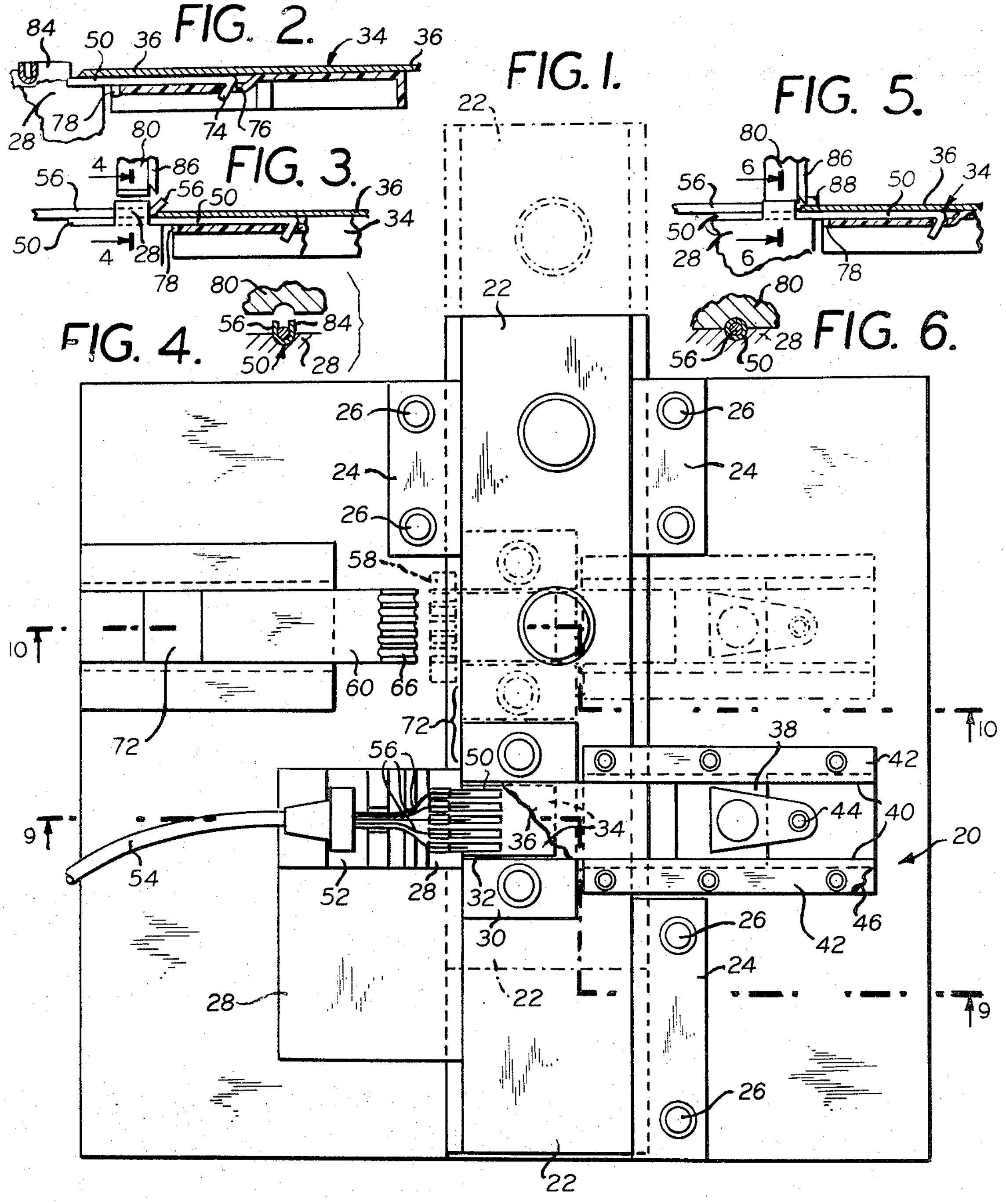
FIG. 1 is a fragmentary plan view of apparatus for connecting and forming elements of an electric circuit component in accordance with this invention.
FIG. 2 is a diagrammatic sectional view on the line 2—2 of FIG. 1, showing the way in which the termination is originally assembled with the enclosure.
FIG. 3 is a view similar to FIG. 2 but showing a conductor brought into position to have the termination crimped to the end portion of the conductor.
FIG. 4 is a sectional view taken on the line 4—4 of FIG. 3.
FIG. 5 is a view similar to FIG. 3 but showing the operation of the crimping tool and knife.
FIG. 6 is a sectional view taken on the line 6—6 of FIG. 5.

The apparatus of this invention includes a base 20 on which there is a common slide 22 that moves in a guideway formed by guide blocks 24 attached to the base 20 by fastening means 26. In place of the guide block on the lower left hand side of the slide 22 there is a crimping anvil 28 also attached to the base 20. The slide 22 is shown in full lines in FIG. 1 at the lower end of its stroke in which it is in position for a crimping operation; and is shown in dotted lines at the upper end of its stroke in which it is in position for the forming operations.

A support 30 is carried by the slide 22 and there is a spring pressed nest 32 which comprises part of the support 30 and in which an enclosure 34 is held. There is a retainer element 36 for holding the enclosure 34 in the nest 32 and this retaining element 36 is partly broken away in FIG. 1 to show most of the upper surface of the enclosure 34 in full lines.

The retaining element 36 is secured to a carriage 38 which slides in a guideway 40 formed by blocks 42 with undercut edges, secured to an extension 46 of the common slide 22. Thus the guideway 40 and the carriage 34 move as a unit with the support 30 that carries enclosure 34.

There are a plurality of terminations 50 located over the enclosure 34 and with part of the length of each of the terminations 50 extending beyond the end of the enclosure over a stationary nest 52 which rests on the crimping anvil 28. This stationary nest 52 has recesses therein for receiving end portions of each of the terminations 50.

A cable 54 extends to the stationary nest 52 and individual conductors 56 of the cable are placed over the parts of the terminations 50 that extend beyond the enclosure 34. This correlation of the conductors 56, the terminations 50 and the enclosure 34 will be explained more fully in connection with FIGS. 2–8.

The support 30, enclosure 34, terminations 50 and conductors 56 are shown in FIG. 1 at the crimping station of the apparatus. The crimping operation will be described in connection with FIGS. 3 and 4.

After the crimping operation, the cable is released from the stationary nest 52 and the common slide 50 moves upward in FIG. 1 along its guideway to a forming station at which the parts are shown in dotted lines in FIG. 1. When the support 30 reaches the forming station, the portions of the terminations 50, which extend beyond the end of the enclosure 34, and which are crimped to the conductors 56, are located under a first forming tool 58; and they are also located in alignment with a second forming tool 60. The first forming tool 58 moves through a stroke perpendicular to the plane of the paper in FIG. 1 and its operation will be explained more fully in connection with FIG. 7. It operates in a guide bearing 62 shown in FIG. 10. When the first forming tool 58 has moved downward into the position shown in FIG. 10, a window 64, which opens through the forming tool 58, is brought into position to expose the bent down ends of the terminations 50 to the second forming tool 60 which moves inward towards the right so that its forward portion 66 can engage the terminations to complete the forming operation in a manner which will be explained in connection with FIG. 8.

Figure 10:
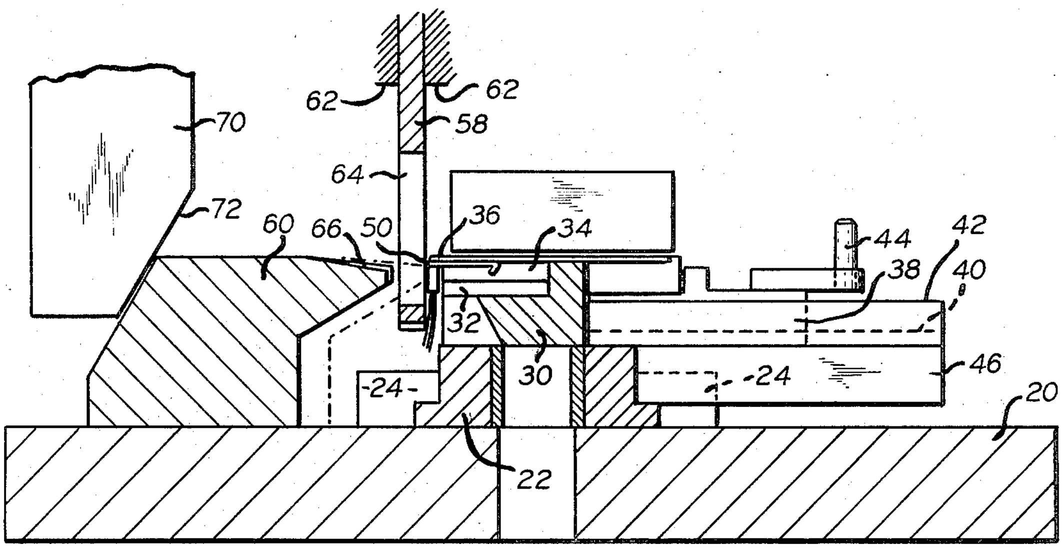
FIG. 10 is a view similar to FIG. 9 but taken through the forming station on the line 10—10 of FIG. 1.

The second forming tool 60 is operated by a cam 70 having an inclined face 72 which bears against a complementary face of the tool 60 to move the tool 60 towards the right in FIG. 10 as the cam 70 moves downward. The apparatus can be constructed so that the cam 70 moves in unison with the first tool 58 but has sufficient travel before moving the second forming tool 60 to the first forming tool 58 to permit the window 64 to move into position in front of the end portion 66 before the end portion 66 has been displaced far enough to reach the forming tool 58.

Referring again to FIG. 1, the common slide 22 is moved into intermediate position between the crimping and forming stations, after the forming operation, so that the enclosure 34 with the terminations 50 and the conductors 54 connected to it can be lifted out of the nest 32. The slide 38 is pulled back toward the right in FIG. 1 to move the retaining element 36 from over the enclosure 34. At this intermediate location, designated in FIG. 1 by the brace 72, there are no tools or other structure in position to obstruct the lifting of the assembled parts from the nest 32 of the support 30.

FIG. 2 shows the enclosure 34 with a termination 50 having an end 74 that hooks on an edge of a socket or opening 76 formed in the top wall of the enclosure 34. The termination 50 is located partly over the enclosure 34, but a substantial part of the termination 50 extends beyond the end of the enclosure 34.

In describing the invention in FIGS. 2 – 8, only one termination will be shown. It will be understood, however, that the terminations 50 are located parallel to one another, as shown in FIG. 1, and in the preferred construction they rest on a slightly depressed top surface of the enclosure 34; but this top surface is a plane surface so that the terminations 50 extend above the surface by their thickness. They thus provide contact surfaces which can be touched by complementary contacts of the electrical circuitry, or by a contact which extends across two or more of the terminations 50. At the end of the enclosure 34, beyond which the terminations 50 extend, there is a groove 78 for each of the terminations to engage when bent downwardly, in a manner which will be explained, and these grooves 78 cooperate with the individual openings 76 to hold the different terminations 50 in parallel relation to one another.

FIG. 3 shows a portion of the enclosure 34 on an enlarged scale and shows the way in which the termination 50 extends across the crimping anvil 28. A tool consisting of a crimper 80 is located above the portion of the crimper anvil 28 across which the termination 50 extends. This crimper 80 moves through a stroke in a guide bearing 82 (shown in FIG. 9) to crimp upstanding edge portions 84 of the termination 50 around the conductor 56 which is placed over the termination 50 before bringing the crimper 80 down on the termination 50.

In order to make it unnecessary to accurately locate the conductor 56 lengthwise with respect to the termination 50, there is a knife 86 carried by the crimper 80 in position to cut off any end portion of the conductor 56 which extends beyond the portion of the termination which is intended to be crimped on the conductor 56. This knife 86 cuts against an anvil plate 36 which is attached to the carriage or slide 38 and which extends over the terminations 50 but under the conductors 56 so that the conductors can be cut without nicking the terminations 50. The anvil plate 36 also serves as a retainer plate to hold the terminations on the enclosure 34 initially before they are bent over by the forming tool 58.

FIG. 5 shows the crimper 80 in its descended position and shows the knife 86 in position where it has cut off a short excess length 88 of the conductor 56. FIG. 6 is a sectional view on FIG. 5 and shows the termination 50 crimped to the conductor 56.

Figure 9:
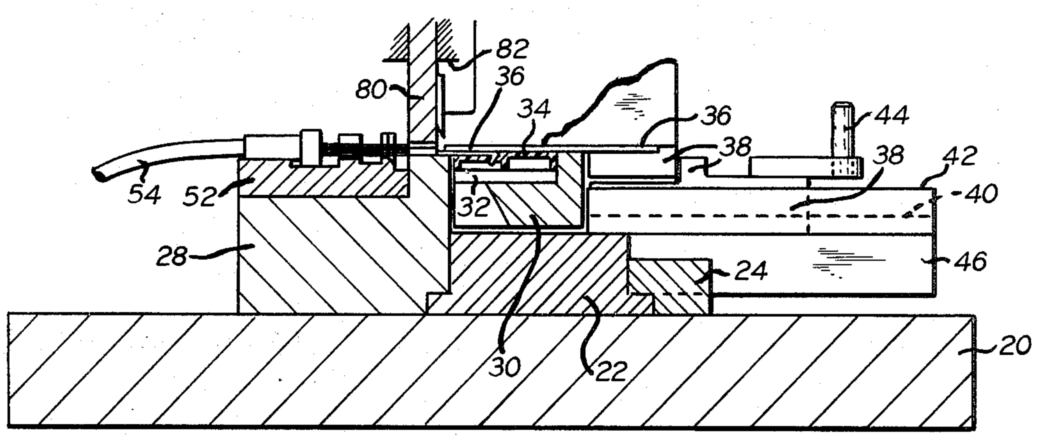
FIG. 9 is a sectional view through the crimping station of the apparatus, the section being taken on the line 9—9 of FIG. 1.

Referring now to FIG. 9, the table 54 is lifted to remove it from confinement by the stationary nest 56 and this lifts the conductors and terminations out of the grooves of the clamping anvil 28 so that the slide 22 can move along its guideway to shift the support 30 from the crimping station to the forming station.

Figure 7:
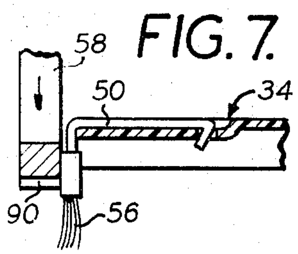
FIG. 7 is a view showing the first operation at the forming station for bending the termination, with the conductor crimped thereto, downward at the end of the enclosure.

FIG. 7 shows the first operation at the forming station. The first tool 58 moves downward and its lower end has grooves 90 for contact with the individual terminations 50 that extend beyond the enclosure 54. This first tool 58 bends the extending part of the termination 50 sharply downward in the groove 78 (shown in FIG. 5) in the end wall of the enclosure 34.

Figure 8:
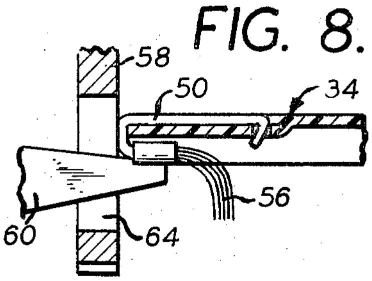
FIG. 8 is a view similar to FIG. 7 but showing the second forming operation in which the termination is bent inward and upward through an open bottom of the enclosure.

FIG. 8 shows the first tool 58 at the bottom of its stroke and shows the second tool 60, which has already been described in connection with FIG. 1, moved inward through the window 64 and into position to bend the lower portions of the terminations 50 which extend below the enclosure 34 inward and into the enclosure 34 and to a position immediately under the portion of the termination 50 which extends across the top of the enclosure 34. This completes the forming operation.

The tool 60 is retracted by spring means (not shown) and the first tool 58 returns to the top of its stroke. The operating mechanism for moving the tools is not shown since it is conventional mechanism such as used on forming machinery; it forms no part of the present invention and no description of it is necessary for a complete understanding of this invention.

The forming operation being complete, the support for the enclosure and its connected terminations and conductors are moved to an intermediate position between the crimping and forming station so that the assembly can be removed from the nest in which it is held, as previously described.

The preferred embodiment of the invention has been illustrated and described, but changes and modifications can be made and some features can be used in different combinations without departing from the invention as defined in the claims.

What is claimed is:

1. Apparatus for connecting a conductor to an enclosure including in combination a support for holding the enclosure with a termination having part of its length over the enclosure and part of its length extending beyond the enclosure, a crimper operable along a course adjacent to the support and that crimps the extending part of the termination to a conductor placed thereon, and means that bend the extending portion of the termination downward beyond the end of the enclosure and then inward and upward under the part of the termination that is over the enclosure.

2. The apparatus described in claim 1 characterized by the enclosure having a plurality of terminations thereon in generally parallel relation to one another and each having a part of its length over the enclosure and a part extending beyond the enclosure, said crimper being operable to crimp a different conductor to each termination, and the means for bending being operable to bend all of the terminations in similar fashion.

3. The apparatus described in claim 1 characterized by a cutter that severs from the end of the conductor excess material that extends beyond the portion of the conductor which is to be crimped to the termination, and means for operating the cutter during the crimping of the terminal to the conductor.

4. The apparatus described in claim 1 characterized by the conductor being on top of the termination for the crimping operation, an anvil between the termination and the conductor, and the cutter being a knife that moves on its cutting stroke toward the anvil and that presses the conductor against the anvil for the cutting operation.

5. The apparatus described in claim 1 characterized by the support being movable between a crimping station and a forming station, the means that bend the terminations being at the forming station, and means holding the enclosure and terminations on the support during movement of the support between stations and while being operated on at the stations.

6. The apparatus described in claim 1 characterized by the means that bend the extending portion of the termination down being a first former and the means that bend the extending portion inward and upward being a different and second former that operates sequentially of the first former.

7. The apparatus described in claim 6 characterized by the first former including a first tool, a guide in which the tool moves up and down through a stroke, said first tool having an open window opening through a side thereof located above the lower end of the first tool and facing the termination after the termination has been bent downward by the first tool, the second former including a second tool that moves in a stroke transversely of the stroke of the first tool and that moves through the window into contact with the termination, and cam means that move with the first tool for operating the second tool.

8. The apparatus described in claim 5 characterized by the support being a spring loaded nest, a slide by which the nest is carried, a guideway on which the slide moves to shift the nest between the crimping station and the forming station, the stations being spaced apart along the guideway by an unobstructed space in which the enclosure with the conductors attached can be removed from the nest when the slide is operated, after the forming operation, to bring the slide to an intermediate station that locates the nest between the crimping and forming stations.

9. The apparatus described in claim 2 characterized by the enclosure having a plurality of terminations thereon in generally parallel relation to one another, and each having a part of its length over the enclosure and a part extending beyond the enclosure, openings in the top surface of the enclosure, hooks on the end of each termination that engage one side of one of the opening to prevent movement of the terminations parallel to the top surface of the enclosure in a direction toward the extending parts of the terminations, a retaining plate that moves in over the enclosure and over the parts of the terminations that are over the enclosure for holding the terminations down on the enclosure, and a carriage movable toward and from the enclosure in the direction in which the terminations extend and by which the retaining plate is carried.

10. The apparatus described in claim 9 characterized by the support being movable between a crimping station and a forming station, the means that bend the terminations being at the forming station, means holding the enclosure and the terminations on the support during movement of the support between stations and while being operated on at the stations, the support being a spring loaded nest, a slide by which the nest is carried, a guideway in which the slide moves to shift the nest between the crimping station and the forming station, the stations being spaced apart along the guideway by an unobstructed space in which the enclosure with the conductors attached can be removed from the nest when the slide is operated, after the forming operations, to bring the slide to an intermediate station that locates the nest between the crimping and forming stations, the means that bend the extending portions of the terminations down being a first former and the means that bend the extending portions inward and upward being a second former that operates sequentially of the first former, the first former including a first tool and a guide in which the tool moves up and down through a stroke, said first tool having an open window opening through a side thereof and located above the lower end of the first tool and facing the terminations after they have been bent downward by the first tool, the second former including a second tool that moves in a stroke transversely of the first tool and that moves through the window into contact with the terminations, and cam means that move in a direction to operate the second tool.

* * * * *